3,503,754
PROCESS FOR AIR CLASSIFICATION OF CEREAL GRAINS

William A. Weiss, St. Joseph, Mo., assignor to Krause Milling Company, Milwaukee, Wis., a corporation of Wisconsin
No Drawing. Filed Oct. 1, 1965, Ser. No. 492,265
Int. Cl. A23l 1/10
U.S. Cl. 99—93      11 Claims

ABSTRACT OF THE DISCLOSURE

An improvement is achieved in the products of air classification of dehulled and degerminated cereal grains by treating the cereal grains with $SO_2$ prior to air classification processing.

---

This invention relates to dry milled cereal flours. More particularly, the invention relates to an improvement in the art of air classification of dry milled cereal flours.

Cereal grains which have been dehulled and degerminated, can be dry milled to produce fine flours comprising primarily starch and lesser percentages of proteins. Grain sorghum, for example, dry milled to a fine flour, contains about 88% starch, 10% protein, 1% fat, 0.5% fiber, and 0.5% ash (on a dry basis). However, for many uses, the components present, other than the starch, detract from the utility of the product because of their insolubility, color and odor.

Procedures have been developed involving air classification of dry milled flours which have made it possible to produce a wide variety of materials differing markedly in chemical composition and physical properties. In these procedures, a protein shift occurs whereby there are produced relatively large volume fractions which are high in starch content and relatively depleted of discrete protein particles, and other fractions which are predominantly discrete protein-matter particles. In the prior art, examples of air classification procedures are disclosed in U.S. Patent Nos. 3,077,308, 3,077,407 and 3,077,408 granted to Rosza et al.

The prior art also discloses methods of producing various fractions of corn and sorghum flours by fine dry grinding and air classification procedures. The composition of each fraction varies and useful recombinations of fractions are possible which have definite analytical and desired physical properties. The variety of recombined flours are useful for many industrial and feed purposes. For example, low fat fractions find specialized industrial uses where the use cannot tolerate higher fat contents. The following prior art articles relate to the foregoing: "Fractionating Corn, Sorghum and Soy Flours by Fine Grinding and Air Classification," V. F. Pfeifer et al., American Miller and Processor, August 1960, pp. 11, 12, 13, and 24; and "Progress Report on Cereal Flour Fractionation—Part Two," A. C. Stringfellow et al., American Miller and Processor, May 1962, pp. 22–23.

This invention provides a novel method of improving the efficiency of fine grinding and air classification of cereal grain flours. The improvement comprises a pretreatment of the endosperm particles of the cereal grains under relatively dry conditions whereby the pretreated particles retain their dry, free-flow characteristics. Thereby, the pretreated particles, after grinding, are more efficiently separated in the air classification step.

It is known that the use of sulfurous acid solutions will tend to loosen the starch-protein complex in the endosperm of cereal grains such as sorghum and corn. For example, a known procedure for producing pure starch is to slurry corn or sorghum in a dilute solution of sulfurous acid and then to separate the starch by wet grinding and various screening and centrifugation steps.

According to this invention, the dehulled and degerminated endosperm particles of cereal grains are pretreated with a solution of sulfurous acid or equivalent chemicals. This loosens the starch-protein complex of the endosperm particles. The treating solution is used in such an amount that the particles do not lose their dry, free-flow characteristics and can thereafter be milled in a normal manner to a flour suitable for air classification procedures.

Although sulfurous acid solutions have been previously used to treat endosperm particles as stated above, as far as is known, no previous treatment has been carried out while maintaining the dry, free-flow characteristics of the particles permitting dry milling and air classification of the flour.

The treating solution may comprise about 0.1% to about 1% concentration of $SO_2$ by weight in water. Greater concentrations are not ordinarily necessary to give the desired results, and the upper limit would be based on practical economics. The optimum solution strength is one which permits the use of maximum concentrations of $SO_2$ and will still maintain the dry, free-flow characteristics of the cereal grain being treated. Generally, the moisture content may be raised to a range of about 15% to about 28% without impairing the flow characteristics depending upon the particular cereal grain being treated. The period of time required for treatment may range between a period of 4 hours to 48 hours, depending on the material being treated and the solution strength. Room temperatures to about 130° F. are suitable.

By way of example, with dehulled, degerminated sorghum grits, optimum concentration of $SO_2$ in aqueous solution may be in the range of 0.25% to 0.4% by weight. With this concentration, at normal room temperatures, for a period of about 20 to 36 hours, the moisture content of the sorghum grits will be raised to about 28% (based on the dry weight of the grits) without impairing the dry, free-flow characteristics thereof.

The following examples are illustrative of the method of this invention but are not intended to be limiting in any sense:

EXAMPLE 1

Dehulled, degerminated sorghum grits were dry milled in a Schutz O'Neill pulverizer. The milled product was 100% finer than 100 microns and 50% finer than 18 microns. The particle size distribution of the milled product was as follows:

TABLE I—UNTREATED GRITS

| Particle size (microns): | (Percent finer than given particle size) |
|---|---|
| 0 | 0 |
| 5 | 3.5 |
| 10 | 16.9 |
| 20 | 58.4 |
| 30 | 82.6 |
| 40 | 89.6 |
| 60 | 96.6 |
| 80 | 98.3 |
| 100 | 100 |

This material was separated in a Pillsbury No. 1 size (No. 544) T Separator (air classified) to give 5 end products. The analysis of these products and the base flour is as follows:

TABLE II

| Sample | Protein (Percent) | Fat (Percent) | Fiber (Percent) | Ash (Percent) | Yield (Percent of Start) |
|---|---|---|---|---|---|
| Base flour | 8.6 | 0.7 | 0.5 | 0.45 | |
| 1 | 22.9 | 2.6 | 1.5 | 2.2 | 9.1 |
| 2 | 9.3 | 1.1 | 0.75 | 1.2 | 14.6 |
| 3 | 5.4 | 0.6 | 0.3 | 0.3 | 21.4 |
| 4 | 5.2 | 0.6 | 0.4 | 0.4 | 15.1 |
| 5 | 9.4 | 0.4 | 0.6 | 0.7 | 39.8 |

Table II shows a yield of 36.5% of a low protein fraction (samples 3 and 4), 9.1% of a high protein fraction (sample 1), and 54.4% of a product similar to the starting material (samples 2 and 5).

EXAMPLE 2

Sorghum grits from the same lot as in Example 1, were treated with a 0.25% solution of $SO_2$, enough being used to raise the total moisture content from 13% to 26%. The treated grits were held 24 hours at room temperature and milled in the same manner as in Example 1, giving a product 100% finer than 100 microns and 50% finer than 18 microns.

The particle size distribution of the pretreated pulverized flour material provided distribution data, as follows:

TABLE III—TREATED GRITS

| Particle size (microns): | (Percent finer than given particle size) |
|---|---|
| 0 | 0 |
| 5 | 1.5 |
| 10 | 13.9 |
| 20 | 66.1 |
| 30 | 90.8 |
| 40 | 95.4 |
| 60 | 98.5 |
| 80 | 10.0 |
| 100. | |

From the above data it will be recognized that the pretreated grits produced a finer particle size under the same grinding conditions, and that there is obtained a considerably larger fraction between 10 and 40 micron size where much of the protein shift appears to occur.

The base flour (pretreated) was classified in the same equipment as in Example 1 with the following results:

TABLE IV

| Sample | Protein (percent) | Fat (percent) | Fiber (percent) | Ash (percent) | Yield (percent) |
|---|---|---|---|---|---|
| Base flour | 8.1 | 0.6 | 0.6 | 0.45 | |
| 2 | 30.0 | 2.6 | | 2.4 | 7.6 |
| 5 | 13.7 | 1.4 | | 1.3 | 13.1 |
| 3 | 5.4 | 0.8 | | 0.04 | 29.7 |
| 4 | 5.1 | 0.8 | | 0.3 | 24.0 |
| 1 | 9.5 | 0.8 | | 0.4 | 25.6 |

This separation gave a yield of 53.7% low protein material (samples 3 and 4), 7.6% very high protein product (sample 1), and 38.7% intermediate protein product (samples 2 and 5). In other words, the pretreatment of the flour material increased the yield of low protein product from 36.5% in Example 1, to 53.70% in Example 2, or on the order of a 15% improvement in starch yield and a correspondingly improved concentration of protein. The pretreatment, as described, appears to condition the starch and protein grain material for a better breakdown in a critical particle size of about 10 to 40 microns with increased efficiency in air separation and classification.

The starch product obtained has many commercial usages and while a higher starch yield is obtained, the fractionated starch exhibits higher viscosity, better color, less odor, fewer insolubles, and better film characteristics after cooking in water than the parent material. Thus, the pretreatment of the cereal grains provides a larger proportion of product having desirable characteristics for adhesives, sizing and other applications. The low protein fraction has better rheological properties (less thixotropy as in corrugating adhesives) by virtue of reduced protein content which is probably also benefited by the $SO_2$ modification of the remaining protein. The high protein fractions can be used as feed ingredients, fermentation media, and as a raw material for improved isolation of pure protein products. The reduction of starch content improves the protein factor.

The following is illustrative viscosity data obtained by pretreatment of cereal products to improve air classification.

EXAMPLE 3

Pastes were prepared of various fractions of the pretreated sorghum grits of Example 2 by cooking at 5% solids, cooling to 100° F. and determining Brookfield viscosities. The pastes were also evaluated for color.

TABLE V

| Sample | Protein (precent) | Brookfield (100 r.p.m.) viscosity (centipoises) | Visual color |
|---|---|---|---|
| Base flour | 8.1 | 920 | Gray. |
| 1 (Table IV) | 30.0 | 215 | Very dark gray. |
| 3 (Table IV) | 5.4 | 1,234 | Off white. |
| 4 (Table IV) | 5.1 | 1,312 | Whitest. |

Table V shows that the high protein fraction contains the undesirable dark material and is of a low viscosity. The low protein fractions are of high viscosity and exhibit lighter colors, which are highly desirable.

EXAMPLE 4

Various fractions of Example 2 were also cooked in a Brabender Visco-Amylo-Graph at a solid to water ratio of 1:10.5 and compared to a commercial purified sorghum starch. The peak viscosity and the viscosity after cooking and cooling to 25° C. are given below:

TABLE VI

| Sample | Protein | Viscosity peak | (Brabender units) at 25° C. |
|---|---|---|---|
| Base flour | 8.1 | 445 | 850 |
| Commercial wet milled sorghum starch | | 530 | 1,240 |
| 3 (Table IV) | 5.4 | 510 | 985 |
| 4 (Table IV) | 5.1 | 535 | 1,160 |

Table VI also shows that the low protein fractions are of higher viscosity than the base flour and that they are more nearly comparable to a commercial wet milled pure starch.

EXAMPLE 5

One of the uses for starches in general and a potential use for the low protein fraction is in sizing paper or textiles where the starch is hydrolyzed by enzyme action to lower the viscosity. Using a commercial enzyme (as Miles HT44) at the same level in hydrolyzing a 7.4% solution of starch the following viscosities were obtained after cooling to 145° F. with commercial starch, the base flour, and a low protein sample from Example 2:

TABLE VII

| Sample | Protein (percent) | Viscosity (Brookfield) at 100 r.p.m. (c.p.s.) 145° F. | 100° F. |
|---|---|---|---|
| Base flour | 8.1 | 83.0 | 143.2 |
| Commercial wet milled sorghum starch | | 41.5 | 64.5 |
| 4 (Table IV) | 5.1 | 45.6 | 70.7 |

Table VII again shows the similarity of the low protein fraction to a commercial wet milled starch. Films cast on glass of the above solutions showed that the low protein flour gave a much smoother film than the base flour, indicating a lower level of insoluble material.

The above examples are presented to show the advantages to be expected of the increase in low protein fraction obtained by pretreatment of the cereal grains before milling and air separation.

Although sulfurous acid treating solutions have been shown to be suitable in the process of the invention, any reducing chemicals or salts may be used which are capable of breaking or splitting the sulfur to sulfur linkages in the protein fraction of the cereal grain. Use of dilute $SO_2$ solutions are preferred. However, the use of $SO_2$ gas on moist comminuted cereal grains is also suitable as within the scope of the invention. Furthermore, the $SO_2$ may, in certain cases, be replaced in whole or in part with sodium meta-bisulfite, potassium meta-bisulfite, potassium sulfite, sodium sulfite, and the like compounds including mixtures thereof containing equivalent proportions of $SO_2$ content as set forth heretofore.

I claim:
1. The process comprising the steps of pretreating dehulled and degerminated cereal grains prior to air classification processing, said pretreatment comprising treating said cereal grain with $SO_2$ in the presence of water to loosen the starch-protein complex of the endosperm particles and in an amount that the particles do not lose their dry free-flowing characteristics, milling the grain and air classifying the resulting flour, whereby increased yields of protein-rich and starch-rich fractions are obtained over untreated grain.

2. The process of claim 1 wherein the said cereal grains are pretreated with an aqueous $SO_2$ solution having a concentration in the range of about 0.1% to about 1% by weight.

3. The process of claim 1 wherein the period of pretreatment ranges between about 4 and 48 hours.

4. The process of claim 1 wherein said moisture content of the cereal grain during pretreatment is not permitted to be more than 28%, based on the dry weight of said cereal grain.

5. The process of claim 1 wherein the said cereal grain after pretreatment is milled to a particle size of about 5 to about 100 microns, and air separating the fractions between about 10 microns to about 40 microns.

6. The process of claim 1 wherein the cereal grain is sorghum.

7. The process of claim 1 wherein the cereal grain is corn.

8. A process for producing protein-rich fractions and starch-rich fractions from sorghum, said process comprising the steps of pretreating dehulled and degerminated sorghum grains prior to air classification processing, said pretreatment comprising treating said sorghum grains with an aqueous solution having an $SO_2$ concentration in the range of about 0.25% to about 0.4% by weight, said aqueous solution employed to loosen the starch-protein complex of the endosperm particles and in an amount that the particles do not lose their dry free-flowing characteristics, dry milling said pretreated sorghum grains to a particle size of about 5 to about 100 microns, and air separating the fractions between about 10 microns to about 40 microns, whereby there are obtained increased yields of protein-rich and starch-rich fractions over sorghum grains not subjected to said pretreatment.

9. The process of claim 8 wherein said pretreatment is for a period of 20 to 36 hours at room temperature to about 130° F.

10. The process comprising the steps of pretreating dehulled and degerminated cereal grain prior to air classification processing, said pretreatment comprising treating said cereal grain with an agent selected from the group consisting of sodium meta-bisulfite in water, potassium meta-bisulfite in water, potassium sulfite in water, sodium sulfite in water, and mixtures thereof, said agent being employed to loosen the starch-protein complex of the endosperm particles and in an amount that the particles do not loose their dry free-flowing characteristics, milling the grain and air classifying the resulting flour, whereby increased yields of protein-rich and starch-rich fractions are obtained over untreated grain.

11. The process comprising the steps of pretreating dehulled and degerminated cereal grain prior to air classification processing, said pretreatment comprising treating said cereal grain for a period of between about 4 and 48 hours with an aqueous $SO_2$ solution having a concentration in the range of about 0.1% to about 1% by weight, and controlling the moisture content of said cereal grain during said pretreatment so that the moisture content is not permitted to be more than 28%, based on the dry weight of said cereal grain, to thereby retain the free flowing characteristics of the cereal grain, milling the grain and air classifying the resulting flour, whereby increased yields of protein-rich and starch-rich fractions are obtained over untreated grain.

References Cited

UNITED STATES PATENTS

| | | | |
|---|---|---|---|
| 3,077,308 | 2/1963 | Rozsa et al. | 99—93 XR |
| 3,077,408 | 2/1963 | Rozsa et al. | 99—93 |
| 3,222,183 | 12/1965 | Rozsa et al. | 99—93 |

FOREIGN PATENTS

| | | |
|---|---|---|
| 207,249 | 6/1955 | Australia. |
| 208,940 | 10/1955 | Australia. |

RAYMOND N. JONES, Primary Examiner

U.S. Cl. X.R.

99—80